United States Patent Office 3,025,323
Patented Mar. 13, 1962

---

3,025,323
AMIDE DIOLS AND THEIR ESTERS
Julian K. Rose, South Charleston, and Helmut W. Schulz, Charleston, W. Va., assignors to Union Carbide Corporation, a corporation of New York
No Drawing. Filed Jan. 18, 1957, Ser. No. 634,810
6 Claims. (Cl. 260—561)

This invention relates to a new class of polyols and their esters. More specifically it relates to a new class of diols and to the carboxylic acid esters of the diols and is a continuation-in-part of our copending application Serial No. 422,234, now abandoned.

These new diols can be derived through the action of omega-lactones on the primary amine groups of monoalkanolamines and on the amine groups of primary diamines.

Characteristic of the diols of this invention is the presence of two terminal hydroxyl groups and one internal amide group or two internal amide groups separated by a divalent radical exemplified by alkylene radicals, arylene radicals, and combinations of alkylene and arylene radicals in a divalent chain. Esterification of these diols with carboxylic acids gives the new esters of this invention and requires special catalysts and conditions as will become apparent in the examples cited.

The compounds of this invention are water-soluble, waxy solids which by virtue of their polyfunctionality are particularly useful as intermediates in the synthesis of polymers. Furthermore because of their lubricant properties and water solubility these compounds find utility as softeners and sizes for paper, leather and other porous materials.

Structurally, the diols are characterized by the formula,

HOR'—[CONH—R''']$_n$—NHCO—R'''—OH

In this formula $n$ takes on the values 0 and 1, R', R'', and R''' are divalent hydrocarbon radicals, and, when $n$ is 1, R' equals R'''. Furthermore, R', R'' and R''' are divalent hydrocarbon radicals such as alkylene radicals, arylene radicals, and divalent chains consisting of alkylene and arylene radicals.

The preferred paths to these new diols are through the reactions of omega lactones with omega-hydroxy primary amines and with primary diamines. For the purpose of definition and clarification, the lactones referred to as omega-lactones are those in which the lactone link,

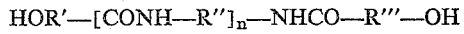

connects the ends of a hydrocarbon chain. Formulawise these lactones may be described by

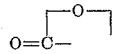

in which R is a hydrocarbon chain. Preferably, in the practice of this invention, are those lactones in which the radical —R—CH$_2$— is a saturated hydrocarbon chain.

The invention may be further illustrated and clarified by examples of compounds useful in the reactions we find to be desirable in making the new diols. Illustrative of suitable lactones are the following::

3 methyl, Δ-valerolactone

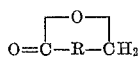

Δ-valerolactone

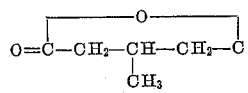

ε-caprolactone

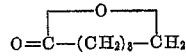

ω-decanolactone

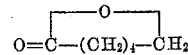

and the higher aliphatic omega lactones. Thus, according to the lactones cited, —R—CH$_2$— in the formula of an omega lactone,

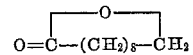

is seen to be in the above listing,

—CH$_2$—CH(CH$_3$)—CH$_2$—CH$_2$
—CH$_2$—CH$_2$—CH$_2$—CH$_2$— and so forth. In general, the lactones are those in which the ring is made up of a hydrocarbon chain joined by the lactone link, in other words, lactones derived from a mono-hydroxy organic acid in which the hydroxyl and acid groups are terminal and separated by a divalent hydrocarbon chain.

Monohydroxy primary amines react with omega-lactones to give the amide diols of this invention. In this reaction the lactone ring opens and a hydrogen migrates to the linking oxygen atom in the lactone resulting in an amide link and a terminal hydroxyl group. Accordingly, the reaction of delta valerolactone with 3-aminopropanol gives N-(3-hydroxypropyl)-5-hydroxyvaleramide as is illustrated by the equation,

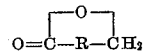

HO(CH$_2$)$_3$NHCO(CH$_2$)$_4$OH

Preferred monohydroxy primary amines are those of the formula HO—A—NH$_2$ in which A is exemplified by alkylene radicals, arylene radicals, and divalent chains made up of alkylene and arylene radicals. Typical of such omega-monohydroxy primary amines are ethanolamine, 3-aminopropanol, 4-aminobutanol, 8-aminooctanol, 10-aminodecanol and 1,4-aminoxylyleneol (p-NH$_2$CH$_2$—C$_6$—H$_4$—CH$_2$—OH)

Generally speaking, omega-monohydroxy primary amines have the amine and hydroxyl groups joined by a divalent hydrocarbon chain.

Diprimary diamines react with two moles of an omega-lactone to give the diamide diols, as shown by the reaction of p-phenylenediamine with delta-valerolactone to give N,N'-di(5-hydroxyvaleryl)-p-phenylenediamine.

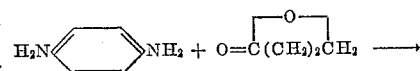

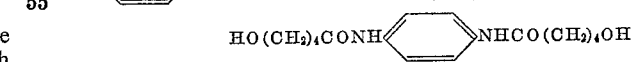

Desirable primary diamines are those in which the amine groups are joined by a divalent hydrocarbon chain exemplified by arylene radicals, alkylene radicals, and divalent chains consisting of arylene and alkylene radicals. Examples of primary diamines are alkylene diamines such as ethylene diamine, hexamethylenediamine, octamethylenediamine and decamethylenediamine, arylene diamines such as p-phenylenediamine, p,p'-diphenylenediamine and 2,6-naphthalenediamine, and chains containing arylene and alkylene radicals such as p,p'-diaminodiphenylmethane

and
1,4-xylylenediamine

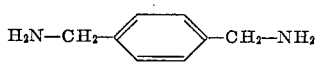

We can describe, in general terms, a primary diamine as two amine groups joined by a divalent hydrocarbon chain.

Thus the compositions of matter of this invention are the compounds of the formula HO—R'—[CONH—R"]$_n$—NHCO—R'"—OH and their monocarboxylic acid esters.

In the formula $n$ has a value from 0 to 1. When $n$ is 0, R' is a divalent hydrocarbon chain as exemplified by arylene radicals, alkylene radicals of at least two carbon atoms and divalent chains consisting of alkylene and arylene radicals, and R'" is a divalent alkylene chain of at least four carbon atoms. When $n$ is 1, R' equals R'", and R' and R'" are divalent alkylene chains of at least four carbon atoms, and R" is a divalent hydrocarbon chain exemplified by arylene radicals, alkylene radicals of at least two carbon atoms, and divalent chains consisting of alkylene and arylene radicals.

A primary object of this invention is to provide a class of diols useful in the formation of polymeric materials suitable for fibers and filaments. Consequently the diols of this invention are those suitable for the formation of such polymeric materials. Diols derived from beta-propiolactone and gamma-butyrolactone are not suitable. Under the strenuous conditions of heat and low pressure necessary to polymerization, as in polyesterification reactions, the diols derived from beta-propiolactone and gamma-butyrolactone are unstable. Diols derived from gamma-butyrolactone show a pronounced tendency to re-form the amine and the lactone from which the diols were derived. On the other hand, the diols derived from the next higher member of the series, delta-valerolactone, show only a slight tendency toward instability and this tendency is easily repressed by the addition of small amounts of the lactone during polyesterification reactions. During polyesterification reactions the instability of the diols derived from beta-propiolactone and gamma-butyrolactone cannot be repressed by the addition of lactone. Diols derived from lactones with chain lengths greater than that of delta-valerolactone are stable under polyesterification conditions.

The requirement that the diols be suitable for polymerization processes defines the lower limit for length of the radical chains for some of the radicals in the formula of the diols, HOR'—[CONHR"]$_n$—NHCO—R'"—OH When $n$ is 0, R'" is derived from a lactone and is at least four carbon atoms in length. When $n$ is 1, R' and R'" are derived from a lactone and are at least four carbon atoms in length.

The preferred amide-diols are defined by the above formula as follows: when $n$ is 0, R' is a divalent hydrocarbon containing from 2 to 4 carbon atoms and R'" is a divalent hydrocarbon chain containing from 4 to 6 carbon atoms; when $n$ is 1, R' and R'" are the same and are divalent hydrocarbon chains of from 4 to 6 carbon atoms, and R" is a divalent hydrocarbon chain of from 2 to 8 carbon atoms in length. The diamide-diols are particularly preferred ($n=1$ in the formula).

In the preparation of the diols of this invention, derived from primary diamines and omega-lactones, the reaction goes at different rates for the members of the saturated aliphatic lactone series. For example, when reacting epsilon-caprolactone with primary diamines a relatively long reaction time is necessary. The reaction requires from 6 to 18 hours, and the use of 1 or 2 moles of the lactone more than that required by theory in order to insure complete reaction of the diamine. When such conditions are necessary it has been found convenient to remove the unreacted lactone by distillation under reduced pressure, or by crystallizing the diamide-diol product from alcoholic solution.

Esterification of the diols is achieved by reacting the diol with an anhydride of a monocarboxylic acid. A fluoro monocarboxylic acid, in an amount of 0.01 percent to 3 percent of the total charge, is used as a catalyst. The diol is mixed with a more than equimolar amount of the anhydride of the monocarboxylic acid and the catalyst; if a solvent for the diol is necessary, an appropriate amount of the monocarboxylic acid from which the anhydride was derived may be used. The reaction mixture is heated and stirred for from 2 to 6 hours. The unreacted constituents of the reaction mixture may be conveniently removed by distillation under reduced pressure, thus recovering the ester.

Suitable catalysts are trifluoroacetic acid and heptafluorobutyric acid.

The following examples are illustrative of this invention.

*Example I*

Hexamethylenediamine, 58 grams (0.5 mol) was reacted with epsilon-caprolactone, 342 g. (3.0 mols) by heating at 100° C. with stirring for 18 hours. Analysis for free amine showed the reaction to be complete at that time. About one-half of the 2.0 mol excess of the lactone was removed by distillation under reduced pressure. The impure product was dissolved in warm methanol and precipitated by the addition of ether. This product on analysis was found to contain 15 percent of unreacted lactone. In the final purification the diamide-diol was dissolved in methanol and treated with the exact amount of 1.0 normal aqueous sodium hydroxide necessary for saponification of the lactone. The product, N,N'-di(6-hydroxycaproyl) hexamethylenediamine was precipitated by adding cold water. After filtering and drying the product had a melting point of 135° C. Analysis with phthalic anhydride for hydroxyl content gave a purity of 99.2 percent. Analysis showed no caprolactone and no free amine.

*Example II*

Delta-valerolactone (150 g., 1.5 moles) was dissolved in 500 cc. of dioxane and ethylenediamine (45 g., 0.75 mole) was added to the mixture dropwise over a period of about 2 hours. The rate of addition was controlled to hold the temperature at 65–70° C. and stirring was used throughout the reaction. The diamide-diol precipitated from the dioxane solution and was recovered by filtration. After washing with ether and drying the weight of dried product, N,N'-di(5-hydroxyvaleryl) ethylenediamine, was 176 g., corresponding to a yield of 90 percent. The melting point was 128° C.

*Example III*

Epsilon-caprolactone (114 g., 1.0 mole) and ethylenediamine (30 g., 0.5 mole) were mixed together and after the initial heat of reaction had been dissipated the mixture was heated on the steam bath for 30 minutes. On cooling the product, N,N'-di(6-hydroxycaproyl) ethylenediamine, was obtained as a hard, waxy solid with a melting point of 143° C.

*Example IV*

Epsilon-caprolactone (13 g., 0.15 mole) and tetramethylenediamine (5.4 g., 0.06 mole) were reacted together in the manner of the preceding example. The crude product was recrystallized from methanol and diethyl ether, yielding 12 g., a 55 percent yield based on the diamine of N,N'-di(6-hydroxycaproyl) tetramethylenediamine in the form of a white crystalline solid melting at 95° C. Reaction with phthalic anhydride-pyridine reagent showed the presence of hydroxyl groups.

Example V

Delta-valerolactone (100 g., 1.0 mole) and hexamethylenediamine (58 g., 0.5 mole) were reacted together in the manner of the preceding two examples. The crude product was recrystallized from methanol to give 90 g. (55 percent yield) of white waxy solid melting at 120° C. A reaction with phthalic anhydride-pyridine reagent indicated a purity of 99.4 percent based on hydroxyl content. The following results were obtained in an analysis for elements: calculated for $C_{16}H_{32}O_4N_2$; C 60.8, H 10.13, N 9.0; found: C 61.1, H 11.0, N 8.9.

Example VI

Epsilon-caprolactone (114 g., 1.0 mole) and monoethanolamine (61 g., 1.0 mole) were mixed together and after the initial heat of reaction had been dissipated the mixture was heated on the steam bath for 16 hours. On cooling the product, N-hydroxyethyl-6-hydroxycaproamide, set to a solid, light ivory in color. The melting point of a portion recrystallized from methanol was 70° C.

Example VII 3.1 mols of monoethanolamine were added dropwise to 3 mols of 3-methyl-delta-valerolactone and the product heated at 75° C. for two hours. A quantitative yield of N-hydroxyethyl-3-methyl-5-hydroxyvaleramide of 94.3% purity was obtained.

Example VIII 1.5 mols of delta-valerolactone were reacted with 1.5 mols of monoethanolamine by heating at 75° C. for two hours. A quantitative yield of N-hydroxyethyl-5-hydroxyvaleramide was obtained.

We claim:
1. N,N'-di(6-hydroxycaproyl) hexamethylenediamine.
2. N,N'-di(6-hydroxycaproyl) ethylenediamine.
3. N,N'-di(6-hydroxycaproyl) tetramethylenediamine.
4. N,N'-di(5-hydroxyvaleryl) hexamethylenediamine.
5. N,N'-di(5-hydroxyvaleryl) ethylenediamine.
6. Diamide-diols having the formula:

$$HOR'CONHR''NHCOR'''OH$$

wherein R' and R''' are the same, R' and R''' are divalent alkylene hydrocarbon chains containing from 4 to 6 carbon atoms, R'' is a divalent hydrocarbon chain selected from the group consisting of arylene and alkylene radicals containing from 2 to 8 carbon atoms and wherein the hydroxyl groups are primary hydroxyl groups.

References Cited in the file of this patent

UNITED STATES PATENTS

| | | |
|---|---|---|
| 2,170,845 | Woodhouse | Aug. 29, 1939 |
| 2,347,494 | Meigs | Apr. 25, 1944 |
| 2,357,283 | Peters | Sept. 5, 1944 |
| 2,377,105 | Reichstein | May 29, 1945 |
| 2,437,946 | Evans et al. | Mar. 16, 1948 |
| 2,710,404 | Rowe | June 7, 1955 |
| 2,773,852 | Rowe et al. | Dec. 11, 1956 |
| 2,817,646 | Payne | Dec. 24, 1957 |

FOREIGN PATENTS

| | | |
|---|---|---|
| 648,886 | Great Britain | Mar. 19, 1947 |

OTHER REFERENCES

Ratchford: Ind. and Eng. Chemistry, vol. 42, pages 1565–67 (1950).

UNITED STATES PATENT OFFICE
CERTIFICATION OF CORRECTION

Patent No. 3,025,323                            March 13, 1962

Julian K. Rose et al.

It is hereby certified that error appears in the above numbered patent requiring correction and that the said Letters Patent should read as corrected below.

Column 1, lines 65 to 68, the formula should appear as shown below instead of as in the patent:

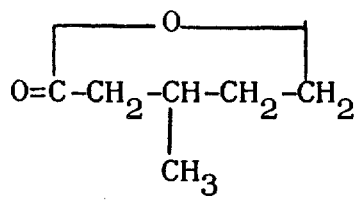

column 2, line 11, for "omega lactone" read -- omega-lactone --; same column 2, lines 16 and 17, the formulas should appear as shown below instead of as in the patent:

$$-CH_2-CH(CH_3)-CH_2-CH_2-, \quad -CH_2-CH_2-CH_2-CH_2-,$$

column 3, line 54, for "R″" read -- R‴ --.

Signed and sealed this 16th day of October 1962.

(SEAL)
Attest:

ERNEST W. SWIDER                                         DAVID L. LADD

Attesting Officer                                            Commissioner of Patents